United States Patent
Ting et al.

(10) Patent No.: US 10,514,786 B2
(45) Date of Patent: Dec. 24, 2019

(54) TOUCH SYSTEM AND TOUCH DETECTION METHOD OF THE SAME

(71) Applicants: IMAGINATION BROADWAY LTD., New Taipei (TW); SALT International Corp., New Taipei (TW)

(72) Inventors: Ko-Hao Ting, New Taipei (TW); Shih-Chieh Wei, New Taipei (TW)

(73) Assignees: IMAGINATION BROADWAY LTD., New Taipei (TW); SALT INTERNATIONAL CORP., New Taipei (TW)

( * ) Notice: Subject to any disclaimer, the term of this patent is extended or adjusted under 35 U.S.C. 154(b) by 49 days.

(21) Appl. No.: 15/697,544

(22) Filed: Sep. 7, 2017

(65) Prior Publication Data
US 2018/0074610 A1 Mar. 15, 2018

(30) Foreign Application Priority Data
Sep. 9, 2016 (TW) .............................. 105129302 A

(51) Int. Cl.
*G06F 3/044* (2006.01)
*G06F 3/041* (2006.01)

(52) U.S. Cl.
CPC .............. *G06F 3/041* (2013.01); *G06F 3/044* (2013.01); *G06F 3/0418* (2013.01); *G06F 2203/04101* (2013.01)

(58) Field of Classification Search
CPC ........ G06F 3/041; G06F 3/0418; G06F 3/044; G06F 2203/04101; G06F 3/0416
See application file for complete search history.

(56) References Cited

U.S. PATENT DOCUMENTS

| | | | | |
|---|---|---|---|---|
| 8,773,146 B1* | 7/2014 | Hills | ...................... | G01N 27/22 324/658 |
| 8,982,097 B1* | 3/2015 | Kuzo | .................... | G06F 3/0418 345/174 |
| 9,310,950 B2* | 4/2016 | Takano | .................... | G06F 3/044 |
| 9,652,078 B2* | 5/2017 | Tsuyuzaki | ............. | G06F 3/0418 |
| 2011/0050618 A1* | 3/2011 | Murphy | ............... | G06F 1/3215 345/174 |
| 2012/0050214 A1* | 3/2012 | Kremin | ................. | G06F 3/0418 345/174 |
| 2012/0217982 A1* | 8/2012 | Narayanasamy | .... | H03K 17/962 324/686 |
| 2013/0141387 A1* | 6/2013 | Royhob | .................. | G06F 3/044 345/174 |

(Continued)

*Primary Examiner* — Jose R Soto Lopez
(74) *Attorney, Agent, or Firm* — WPAT, PC

(57) ABSTRACT

A touch detection method includes performing a detection method to obtain a signal point along with a signal value and a signal state, wherein the signal state has a positive state generated by proximity touch and a negative state by generated by impurity touch; checking a previous signal state generated by previous detection method and a current signal state generated by current detection method; comparing the previous signal state and the current signal state, and counting a number when the signal states of the previous signal state and the current signal are the same; determining if the number is greater than a threshold; and proceeding a base signal updating when the number is greater than the threshold.

9 Claims, 3 Drawing Sheets

(56) References Cited

U.S. PATENT DOCUMENTS

| | | | |
|---|---|---|---|
| 2013/0176268 A1* | 7/2013 | Li | G06F 3/044 345/174 |
| 2013/0207935 A1* | 8/2013 | Toda | G06F 3/0418 345/174 |
| 2013/0278543 A1* | 10/2013 | Hsu | G06F 3/044 345/174 |
| 2014/0043287 A1* | 2/2014 | Nakajima | G06F 3/0418 345/174 |
| 2014/0198064 A1* | 7/2014 | Kim | G06F 3/0418 345/173 |
| 2015/0185919 A1* | 7/2015 | Chang | G06F 3/044 345/174 |
| 2015/0346903 A1* | 12/2015 | O'Connor | G09G 5/003 345/173 |
| 2015/0379914 A1* | 12/2015 | Imai | G09G 3/20 345/204 |
| 2016/0266717 A1* | 9/2016 | Oral | G06F 3/0418 |
| 2016/0334932 A1* | 11/2016 | Nakajima | G06F 3/044 |
| 2016/0357340 A1* | 12/2016 | Ma | G06F 3/0418 |
| 2017/0052625 A1* | 2/2017 | Bryant | G06F 3/04883 |
| 2017/0060335 A1* | 3/2017 | Chiang | G06F 3/0418 |
| 2017/0131841 A1* | 5/2017 | Chang | G06F 3/0418 |
| 2018/0074610 A1* | 3/2018 | Ting | G06F 3/041 |

* cited by examiner

TOUCH SYSTEM AND TOUCH DETECTION METHOD OF THE SAME

CROSS-REFERENCE TO RELATED APPLICATION

This application claims the benefit of priority to Taiwan patent application Ser. No. 105129302 entitled "TOUCH SYSTEM AND TOUCH DETECTION METHOD OF THE SAME", filed Sep. 9, 2016, which is also incorporated herein by reference.

FIELD OF THE INVENTION

The present invention pertains to a touch system and a touch detection method, and especially pertains to a touch system and a touch detection method applied in touch panel, where there are polar molecules such as water, palm or other noise on its surface. The present invention can immediately and efficiently updating the touch detection.

BACKGROUND OF THE INVENTION

A touch panel or touch screen is one of the major interfaces between human and machine, and as a recognition device, can ingeniously combine input and display interfaces, and therefore has the advantages of saving device space and user-friendly operation. Nowadays it has been generally applied to a wide variety of consuming or industrial electronic products. For example, PDAs (Personal Digital Assistant), palm-sized PCs (Personal Computers), tablet computers, mobile phones, handwriting input devices for a smart phone, IAs (Information Appliances), ATMs (Automated Teller Machines) and POS (Points-of-Sale), etc., which can generally be seen in various occasions of business and industry applications.

With the touch panel widely applied in a variety of electronic products, users have more need for the medium and large panel. For avoiding that wrist or palm inadvertently touches the panel, how to effectively determine the signal caused by wrist or palm and to prevent wrist or palm from interfering the detection result is the most important issue in touch technology, so user's wrist or palm can be easily placed on the panel. Moreover, water or steam could stains the touch panel in the humid environment, or the effect of temperature changes on the touch panel.

For solving said issue, updating the base signal is performed when the touch panel is non-active, and updating is not performed when the touch panel is active in the conventional method. However, the conventional method may cause a heterogeneous signal for a long time, which may be judged to be an abnormal operation, if there is palm or water stains staying on the touch panel when the touch system boots. For avoiding the abnormal operation, which is misjudged to be an object touch so an active signal is generated and updating the base signal is not performed, it needs a new method to solve the different base signal when detecting. Once the heterogeneous such as palm or water stains leaves the touch panel, it may cause the object touch misjudged if user touch the touch panel by an object such as finger or stylus.

SUMMARY OF THE PRESENT INVENTION

The present invention determines whether or not to update the base signal by the cumulative number of the same signal states of the base signal. According to the touch detection method of the present invention, the negative state of the heterogeneous, such as palm or water stains, gradually decreases its influence on signal value with each update, and finally makes the negative state disappear during the detection period. The present invention can eliminate the abnormal operation or reduce the impact of abnormal boot, and avoid the error base signal caused by detecting the negative state for a long time.

At least some of these and other objectives described herein will be met by some embodiments of the present invention.

In order to achieve one, some or all of the above stated objectives or others, a touch detection method according to the embodiments of the present invention is provided. The touch detection method includes the steps of performing a detection method to obtain a signal point with a base signal value and a signal state, wherein the signal state comprises a positive state generated by proximity touch and a negative state generated by impurity touch; checking a previous signal state generated by previous detection method and a current signal state generated by current detection method; comparing the previous signal state with the current signal state, and counting a cumulative number if the signal states of the previous signal state and the current signal state are the same; determining if the cumulative number is greater than a threshold; and performing a base signal updating if the cumulative number is greater than the threshold. Wherein the threshold is decreased as the amount of detected noise increase when the signal point is detected.

In another embodiment, the step of comparing the previous signal state with the current signal state includes setting the cumulative number to zero if the previous signal state is different from the current signal state.

In another embodiment, the base signal updating is not performed if the cumulative number is less than the threshold.

In another embodiment, the step of performing the base signal updating includes: detecting whether the signal point is active; and updating the base signal value (Z) of the signal point to a previous base signal value (Y) plus a first coefficient (a) multiplied by a difference (X−Y) between the current base signal value (X) and the previous base signal value (Y) if the signal point is inactive. That is, a new base signal value is $Z=(X-Y)*a+Y$. By the contrast, updating the base signal value (Z) of the signal point for the previous base signal value (Y) plus a second coefficient (b=+1, +2, +3 . . . ) multiplied by the previous signal state (Y') if the signal point is active. That is, a new base signal value is $Z=Y+b*Y'$. The first coefficient is any value, and the second coefficient is a positive integer and increased as the amount of detected noise increase when the signal point is detected.

In order to achieve one, some or all of the above stated objectives or others, a touch system according to the embodiments of the present invention is provided. The touch system includes a plurality of driving electrodes, a plurality of sensing electrodes and a detecting module. The driving electrodes and the sensing electrodes have a plurality of regions which are overlapped with each other but not in contact. The detecting module is electrically connected to the driving electrodes and the sensing electrodes. The detecting module includes a control unit, a driving unit, a sensing unit, etc. The control unit is for performing said touch detection method and calculating and storing the result of the base signal value, which is updated or not. The driving unit includes a boost driving circuit. The sensing unit includes a Low-pass filter, a plurality of analog-to-digital signal converters and line switchers, a capacitor, etc.

DETAILED DESCRIPTION OF THE INVENTION

It is to be understood that both the foregoing general description and the following detailed description are exemplary and explanatory only and are not restrictive of the invention, as claimed. It should be noted that, as used in the specification and the appended claims, the singular forms "a", "an" and "the" include plural referents unless the context clearly dictates otherwise. Thus, for example, reference to "a material" may include mixtures of materials; reference to "a display" may include multiple displays, and the like. References cited herein are hereby incorporated by reference in their entirety, except to the extent that they conflict with teachings explicitly set forth in this specification.

Figure 1:
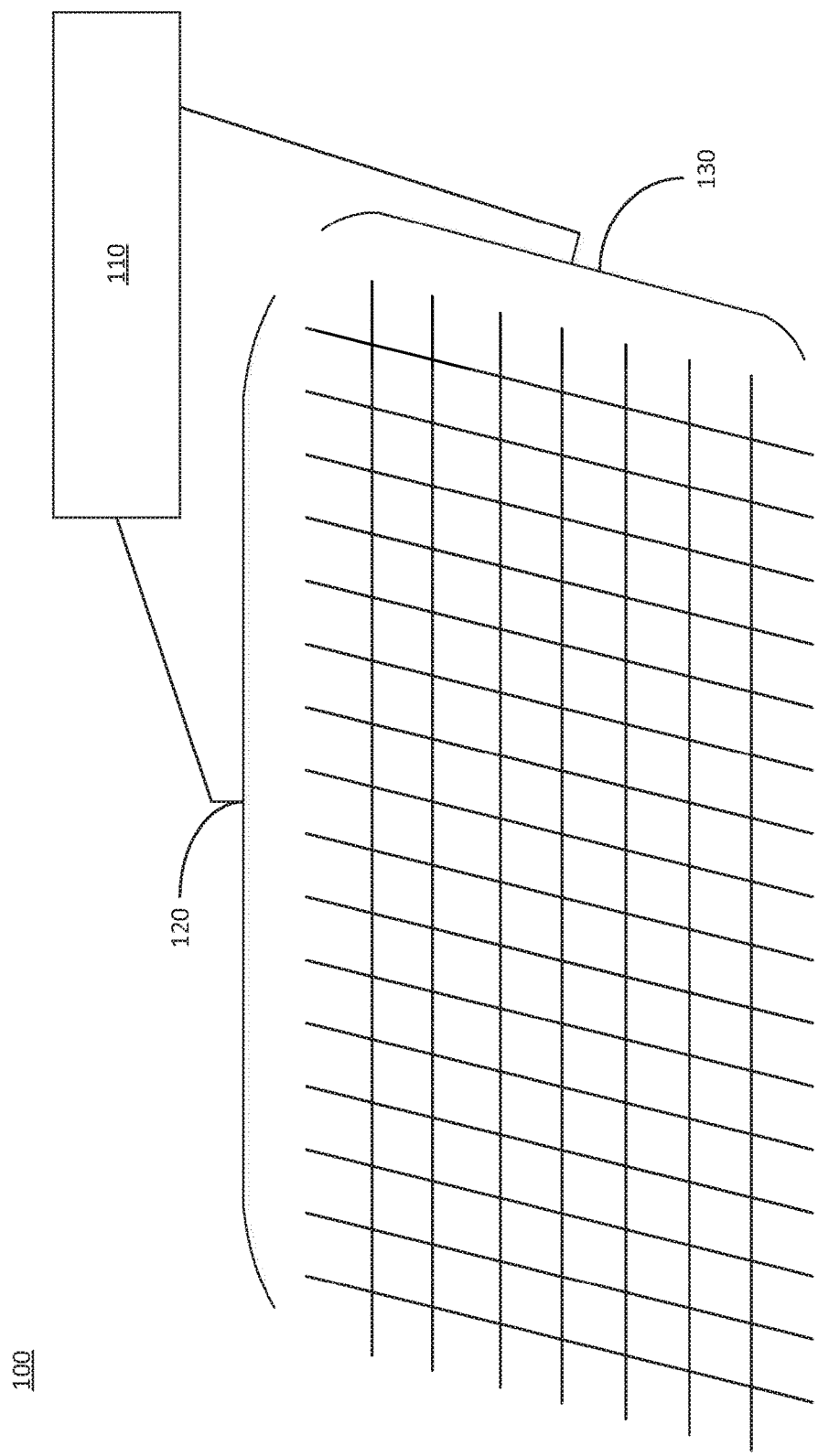
FIG. 1 is a schematic diagram of a touch system of an embodiment.

Please refer to FIG. 1, is a schematic diagram of a touch system 100 of an embodiment according to the present invention. The touch system 100 includes a plurality of driving electrodes 120, a plurality of sensing electrodes 130 and a detecting module 110. The detecting module 110 is electrically connected to the driving electrodes 120 and the sensing electrodes 130. The detecting module 110 includes a control unit, a driving unit, a sensing unit, etc. The control unit is for performing a touch detection method and calculating and storing the result of the base signal value, which is updated or not. The driving unit includes a boost driving circuit. The sensing unit includes a Low-pass filter, a plurality of analog-to-digital signal converters and line switchers, a capacitor, etc. Moreover, the detecting module 110 may transmit the touch signal to other module such as a primary processor of a computer via interfaces.

The driving electrodes 120 and the sensing electrodes 130 have a plurality of regions which are overlapped with each other but not in contact, and a signal point is defined at the intersection of one of the driving electrodes 120 and one of the sensing electrodes 130. When the touch regions is scanned, the detection module 110 drives the driving electrodes 120 in turns and detects electrical changes of the sensing electrodes 130. When the touch system is booted or inactive, the touch regions is kept to be scanned to obtain the base signal value of each signal point. If there is any electrical changes of the sensing electrodes 130, the detection module 110 determines there is a touch object around the overlapped regions of the driving electrodes 120 and the sensing electrodes 130 and a pointing signal is generated by performing subsequent operations with the above-obtained base signal value. In order to scan all the overlapped areas on the touch panel, it is at least once to drive all the drive electrodes 120 in turns.

Figure 2:
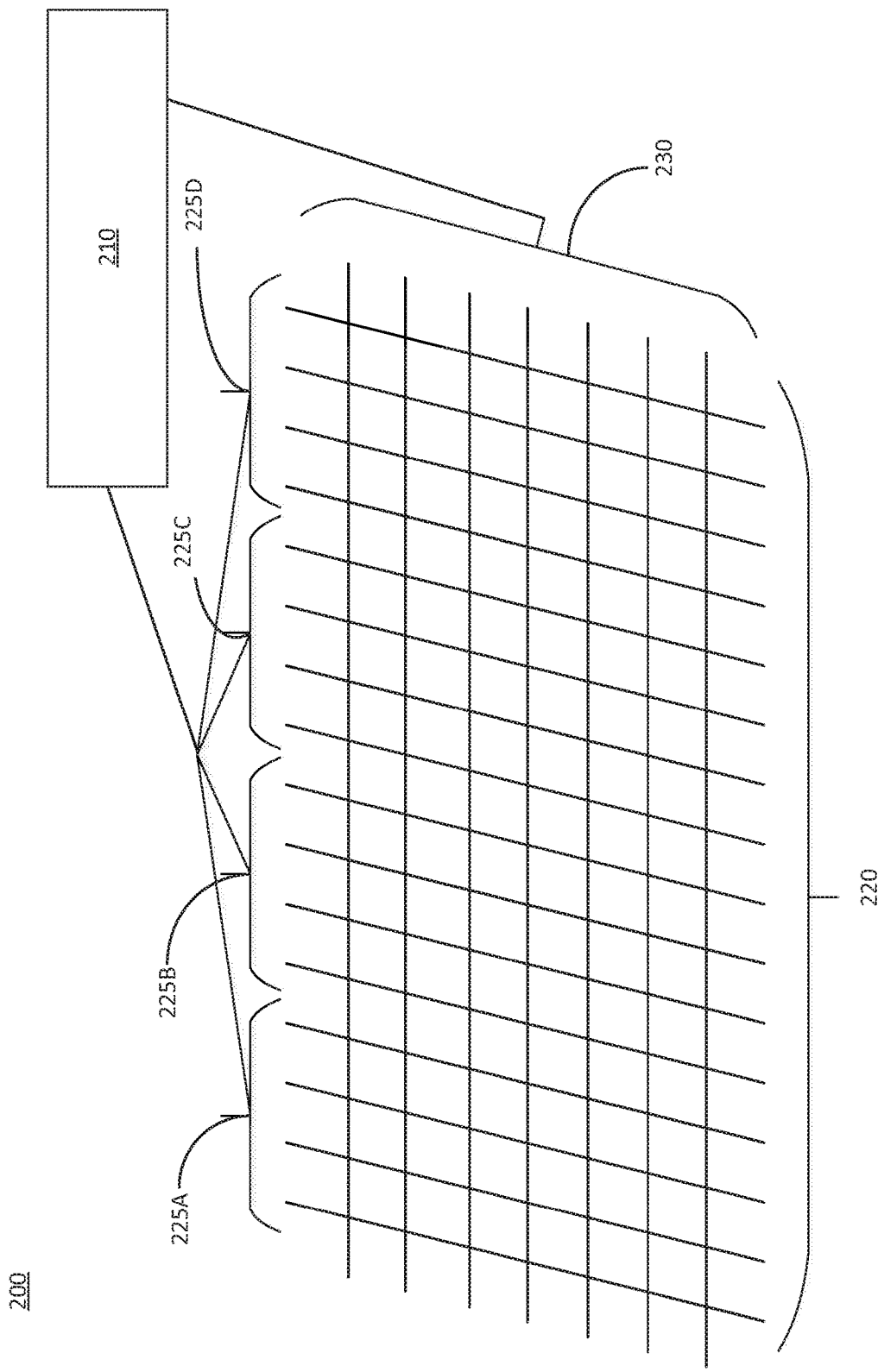
FIG. 2 is a schematic diagram of a touch system of another embodiment.

FIG. 2 is a schematic diagram of a touch system 200 of another embodiment. The touch system 100 includes a plurality of driving electrodes 220, a plurality of sensing electrodes 230 and a detecting module 210. The detecting module 210 is electrically connected to the driving electrodes 220 and the sensing electrodes 230. the detecting module 210 may transmit the touch signal to other module such as a primary processor of a computer via interfaces.

The driving electrodes 220 and the sensing electrodes 230 have a plurality of regions which are overlapped with each other but not in contact. The difference between the touch systems of FIG. 1 and FIG. 2 is that the plural driving electrodes 220 are divided into groups of the driving electrodes 225A-225D. Each of the four driving electrodes 220 is a group of the driving electrodes 225 in the embodiment of FIG. 2, and there are total four groups of the driving electrodes 225A-225D. In addition to the first group, the first drive electrode of each group 225 is disposed adjacent to the last drive electrode of the previous group 225. It is understood by those of ordinary skill in the art that the embodiment shown in FIG. 2 employs the four groups of the driving electrodes and each group having four driving electrodes, but the present invention is not limited to that.

Figure 3:
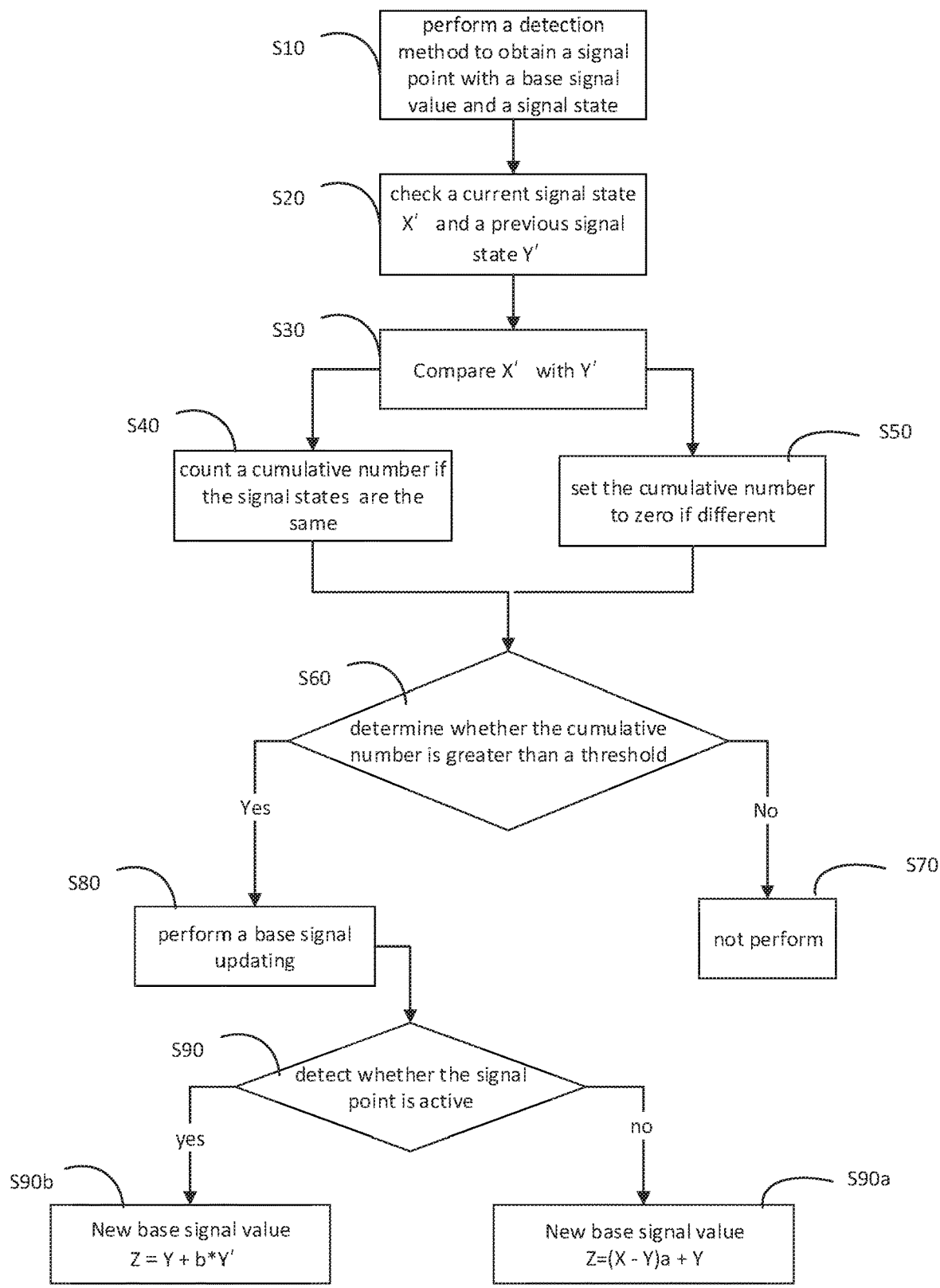
FIG. 3 is a flow chart of a touch detection method of an embodiment according to the present invention.

The following descripts that the present invention determines whether or not to perform a base signal updating by the cumulative number of the same signal states of the base signal. The present invention can eliminate the abnormal operation or reduce the impact of abnormal boot, and avoid the error base signal caused by detecting the heterogeneous for a long time. Refer to FIG. 3, which is a flow chart of a touch detection method of an embodiment according to the present invention.

Step S10: Performing a detection method to obtain a signal point with a base signal value X/Y (base/pre-base) and a signal state X'/Y' (state/pre-state). The signal state comprises a positive state (+) generated by proximity touch and a negative state (−) generated by impurity touch. In the embodiment of the touch system 100 shown in FIG. 1, the detection module 110 drives the driving electrodes 120 in turns and detects electrical changes of the sensing electrodes 130 to obtain a plurality of base signals along with the signal value and the signal state. In another embodiment of the touch system 200 shown in FIG. 2, the detection module 200 drives the groups of the driving electrodes 225 in turns and detects electrical changes of the sensing electrodes 230 to obtain a plurality of base signals along with the signal value and the signal state.

Step S20: Checking a previous signal state Y' (pre-state) generated by previous detection method and a current signal state X' generated by current detection method.

Step S30: Comparing the previous signal state Y' with the current signal state X'.

Step S40: Counting a cumulative number if the signal states of the previous signal state Y' and the current signal state X' are the same. In other words, the number of the same states is cumulated to obtain the cumulative number.

Step S50: Setting the cumulative number to zero if the previous signal state Y' is different from the current signal state X'.

Step S60: Following up the step S40 or S50, and determining if the cumulative number is greater than a threshold (TH). The threshold is decreased as the amount of detected noise increases when the signal point is detected. The threshold is adjusted by the detected noise of the signal point in the step S10 so as to increase the rate of the base signal updating and to reduce the probability of misjudgment.

Step S70: Following up the step S60. The base signal updating is not performed if the cumulative number is less than the threshold.

Step S80: Following up the S60. The base signal updating is performed if the cumulative number is greater than the threshold.

Step S90: Following up the S80, and detecting whether the signal point is active. In other words, this step is for detecting whether there is touch object such as finger or stylus on the touch panel, so the signal point is generated.

Step S90a: Updating the base signal value Z of the signal point to a previous base signal value Y plus a first coefficient a multiplied by a difference (X-Y) between the current base signal value X and the previous base signal value Y, if the signal point is inactive. That is, a new base signal value is Z=(X-Y)*a+Y. The first coefficient a is any value.

Step S90b: Updating the base signal value Z of the signal point for the previous base signal value Y plus a second coefficient b multiplied by the previous signal state Y', if the signal point is active. That is, a new base signal value is Z=Y+b*Y'. Y' represents the signal state containing the positive state generated by proximity touch and a negative state generated by impurity touch, and stands for + or − in the operation of the new base signal value to adjust the positive and negative values of the second coefficient b. The second coefficient b is a positive integer b=+1, +2, +3 . . . and adjusted by the detected noise of the signal point in the step S10. As the amount of the detected noise increasing, the second coefficient b is increased to adjust the updating value of the new base signal value so as to reduce the probability of misjudgment.

Moreover, in the step S80 of performing the base signal updating, the updating can be divided into groups to be performed in addition to the overall updating is performed. The overall updating the base signal is performed in the embodiment of the touch system 100 in FIG. 1. The time of the overall updating is usually performed at that there is no active signal point, or at there is a huge difference between the current base signal value and the previous base signal value. The huge difference may be caused by abnormal operation when there is palm or water stains staying on the touch panel or when the temperature is significantly changed. The updating divided into groups is performed in the embodiment of the touch system 200 in FIG. 2. The time of the updating divided into groups is usually performed at that there is active signal point, and a group of updating the base signal is performed for the area near said active signal point. Performing the group of updating the base signal can speed up the whole method.

What is claimed is:

1. A touch detection method, comprising the steps of:
    performing a detection method to obtain a signal point with a base signal value and a signal state, wherein the signal state comprises a positive state generated by proximity touch and a negative state generated by impurity touch;
    checking a previous signal state generated by previous detection method and a current signal state generated by current detection method;
    comparing the previous signal state with the current signal state, and counting a cumulative number if the signal states of the previous signal state and the current signal state are the same;
    determining whether the cumulative number is greater than a threshold;
    adjusting the threshold according to a detected noise level of the signal point; and
    performing a base signal updating if the cumulative number is greater than the threshold;
    wherein the threshold is decreased as the amount of detected noise increase when the signal point is detected.

2. The method of claim 1, wherein the step of comparing the previous signal state with the current signal state comprises setting the cumulative number to zero if the previous signal state is different from the current signal state.

3. The method of claim 1, wherein the base signal updating is not performed if the cumulative number is less than the threshold.

4. The method of claim 1, wherein the step of performing the base signal updating comprises:
    detecting whether the signal point is active; and
    updating the base signal value of the signal point to a previous base signal value plus a first coefficient multiplied by a difference between the current base signal value and the previous base signal value if the signal point is inactive.

5. The method of claim 1, wherein the step of performing the base signal updating comprises:
    detecting whether the signal point is active; and
    updating the base signal value of the signal point for the previous base signal value plus a second coefficient multiplied by the previous signal state if the signal point is active.

6. The method of claim 5, wherein the second coefficient is a positive integer and increased as the amount of detected noise increase when the signal point is detected.

7. The method of claim 4, wherein the first coefficient is any value.

8. The method of claim 1, wherein the step of performing the base signal updating comprises:
    detecting whether the signal point is active; and
    performing a group of updating the base signal for the area near said active signal point if the signal point is active.

9. A touch system, comprising:
    a plurality of driving electrodes and a plurality of sensing electrodes, wherein the driving electrodes and the sensing electrodes have a plurality of regions which are overlapped with each other but not in contact;
    a detecting module, electrically connected to the driving electrodes and the sensing electrodes, wherein the detecting module performs a detection method to obtain a signal point of intersection of one of the driving electrodes and one of the sensing electrodes with a base signal value and a signal state, and the signal state comprises a positive state generated by proximity touch and a negative state generated by impurity touch;
    wherein the detecting module checks a previous signal state generated by previous detection method and a current signal state generated by current detection method;
    wherein the detecting module compares the previous signal state with the current signal state, and counting a cumulative number if the signal states of the previous signal state and the current signal state are the same;
    wherein the detecting module performs a base signal updating if the cumulative number is greater than a threshold, and the threshold adjusted according to a detected noise level of the signal point; and
    wherein the threshold is decreased as the amount of detected noise increase when the signal point is detected.

* * * * *